United States Patent

King et al.

[11] Patent Number: 6,138,404
[45] Date of Patent: Oct. 31, 2000

[54] SEEDLING GROWTH ENHANCING DEVICE

[75] Inventors: Lawrence H. King; Joseph F. Lais, both of St. Paul, Minn.

[73] Assignee: Treessentials Company, St. Paul, Minn.

[21] Appl. No.: 08/936,901

[22] Filed: Sep. 25, 1997

[51] Int. Cl.[7] .................................................. A01G 13/02
[52] U.S. Cl. ......................................................... 47/30
[58] Field of Search .................................. 47/30, 21, 23, 47/24, 26; 24/339, 336, 346

[56] References Cited

U.S. PATENT DOCUMENTS

| | | |
|---|---|---|
| D. 298,998 | 12/1988 | Hurlstone . |
| 361,241 | 4/1887 | Rugg . |
| 379,948 | 3/1888 | Frantz . |
| 560,966 | 5/1896 | Brown . |
| 645,518 | 3/1900 | Watt . |
| 770,461 | 9/1904 | Haggerty . |
| 1,031,941 | 7/1912 | Lanham . |
| 2,056,136 | 9/1936 | Hyatt . |
| 3,218,759 | 11/1965 | Barrons . |
| 3,225,922 | 12/1965 | Straight ..................... 24/336 |
| 3,384,992 | 5/1968 | Heffron . |
| 3,816,959 | 6/1974 | Nalle, Jr. . |
| 3,826,040 | 7/1974 | Roberts et al. . |
| 3,828,473 | 8/1974 | Morey . |
| 4,099,299 | 7/1978 | Bruggert et al. . |
| 4,296,524 | 10/1981 | Hoerholt, et al. . |
| 4,333,264 | 6/1982 | Smrt . |
| 4,596,106 | 6/1986 | Kunczynski . |
| 4,699,347 | 10/1987 | Kuhnley . |
| 4,711,051 | 12/1987 | Fujimoto . |
| 4,899,486 | 2/1990 | Hurlstone . |
| 4,922,652 | 5/1990 | Graves . |
| 5,052,086 | 10/1991 | Nasuno ..................... 47/44 |
| 5,161,909 | 11/1992 | Crouse et al. ..................... 24/336 X |
| 5,497,894 | 3/1996 | Krupa et al. . |
| 5,581,935 | 12/1996 | Anderson ..................... 47/23 |
| 5,590,805 | 1/1997 | Knoss et al. . |
| 5,653,345 | 8/1997 | Knoss et al. . |
| 5,687,505 | 11/1997 | Haufler et al. ..................... 47/30 X |

FOREIGN PATENT DOCUMENTS

| | | |
|---|---|---|
| 93 03603 | 3/1993 | European Pat. Off. . |
| 2 740 296 | 4/1997 | France . |
| 15 82 723 | 6/1970 | Germany . |
| 2 048 637 | 12/1980 | United Kingdom . |

OTHER PUBLICATIONS

Treessentials Company, "Supertube Clipper" brochure, 1995.
Tree Sentry, "Now the newest generation is here! introducing the Tree Sentry tree shelter" pricing and order form.
Tree Pro, "Tree Protector Installation Instructions" order form.
Correx Plastics, "New Galemaster".

Primary Examiner—Michael J. Carone
Assistant Examiner—Jeffrey L. Gellner
Attorney, Agent, or Firm—Merchant & Gould P.C.

[57] ABSTRACT

A seedling growth-enhancing device is disclosed, consisting of a circular tube formed from flexible, non-opaque thermoplastic material having a slit formed over its length. The tube is of sufficient size as to substantially enclose the seedling, and the plastic material is inherently resilient so that the device is normally biased into its tubular configuration. The opposed edges of the slit are fastened at the top and bottom to permit the edges to be resiliently spread at an intermediate point to permit access to the seedling for maintenance. Also disclosed are an H-clip for releasably fastening the opposed edges and a wire hanger for suspending the circular tube from an overhead suspension wire.

15 Claims, 5 Drawing Sheets

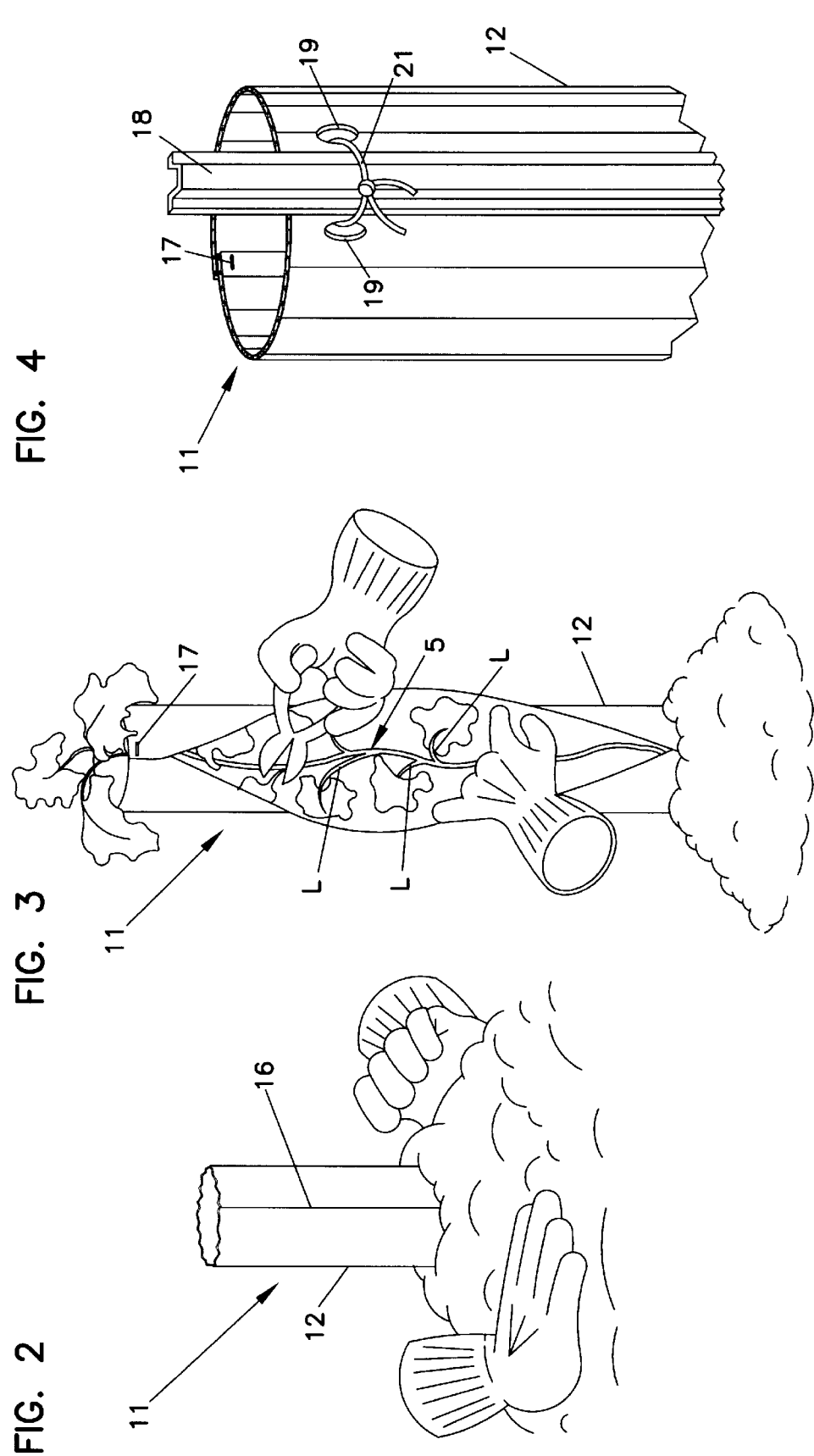

SEEDLING GROWTH ENHANCING DEVICE

The invention is directed to devices for enhancing the growth and form of plant seedlings.

Within the past two decades, plant seedling growth enhancers have been developed and used to assist newly planted seedlings to survive and grow at an enhanced rate and improved form during the early stages after planting. Seedling growth enhancers have found their greatest application to date in the forestry industry where they are installed at the time the seedling is planted and typically remain in place for a period of 5–7 years.

Seedling growth enhancers are commonly referred to by the misnomer "tree shelter", which suggests that the device functions to protect or shelter mature trees. However, it is known in the technology to which these devices pertain that their primary function is to not only protect immature seedlings but, more importantly, to create a micro-environment in which the seedling may flourish in much the same way as a greenhouse enhances the growth of plant seedlings.

Typically, such seedling growth enhancers take the form of a tube of thermoplastic that typically is translucent with a diameter sufficient to encompass the seedling during the period of use and a length that typically is less than the seedling at the time of planting. An example is shown in U.S. Pat. No. 4,899,486 issued to Graham F. Hurlstone on Feb. 13, 1990.

The thermoplastic material used in the formation of tree seedling growth enhancers is often chosen to be degradable when exposed to ultraviolet light. The degrading effect takes place over a time that corresponds generally to the period during which protection and growth enhancement is necessary. Thus, as the tree seedling matures over a number of years, the device progressively degrades in the presence of ultraviolet light and ultimately disintegrates when its function is no longer necessary.

We have found that the principle of seedling growth enhancers may be advantageously applied to other types of seedlings, such as grapevine seedlings which are continuously planted in the grape industry to maintain a necessary level of grape production. If this growth can be enhanced to the point that quality grape production begins at an earlier point in time, this is economically beneficial to the vineyard owner.

Seedling growth enhancers (also known as grow tubes) are advantageously used in connection with grape seedlings. One of the primary benefits is to guide the vine upward in its growth without the need for staking. Without training seedlings to grow upwardly in some manner, they will grow at will along the ground. Grow tubes train the vine to grow upward in a position to be more productive.

Grow tubes also enhance the growth of grape vines by capturing moisture and recycling the moisture as it condenses from vapor on the inner tube surface. Grow tubes also protect the grape vines from herbicides by acting as a barrier or shield to the seedling.

However, conventional grow tubes create a problem insofar that seedling maintenance is concerned because they are in essence permanently installed, and access to the seedling is not possible without removing the plastic tube. Access to the seedling is important because of the possibility of choking weeds, as well as to prune the seedling to ensure that it has only a primary leader during its initial growth stage. In addition, access is necessary to determine whether the seedling is exposed to disease or insect infestation. If access cannot be gained to the grape seedling, its growth may be inhibited or improper for any of these reasons.

These problems have been solved by producing a grow tube having a longitudinal slit over its length together with means for fastening adjacent edges of the slit at the top and/or bottom of the tube. Access to the seedling is gained by spreading the slit at an intermediate point of the tube.

It is important in this regard that, when the opposed tube edges are spread to gain access to the seedling and then released, the access opening is self-closing and the tube returned to its tubular form. This function is not possible if, for example, the tube is formed by simply rolling a flattened rectangular sheet of plastic into a tube. With such a construction, the fastening means holds the opposed edges together but the tendency is for the edges to pull apart. Consequently, the access opening is normally open and the integrity of the tube and the growth-enhancing function are lost.

We have found that the access function is best obtained by forming the device as a continuous plastic tube (e.g., by extrusion) and then slitting the tube longitudinally. In this manner, the tube has inherent resiliency and hence a bias to return to its tubular form after having been spread apart. By fastening the opposed top and bottom edges, access may be gained by spreading the opposed edges at an intermediate point and simply releasing the edges after the pruning and dressing functions have been completed.

However, we have also found that the material from which seedling growth enhancers are conventionally made produces a springiness that, in essence, overbiases the tube edges together, which makes them difficult to spread apart and, accordingly, difficult to use. Specifically, this over-springiness requires use of two hands to spread the tube and to hold it in the spread-apart position, which makes it quite difficult to maneuver the pruning tool into the slit to perform the pruning tasks. Testing has shown that conventional seedling growth enhancers manufactured from polyethylene require at least about 1.5 pounds of force to spread the tube edges a distance of three inches.

In order to operate properly and efficiently, we have found that the amount of force necessary to spread the tube edges three inches apart be no more than about 0.5 pounds. Our testing of various materials indicates that low-density polyolefins (such as low density polyethylene or low density polypropylene) are a suitable material to render this result.

Producing the seedling growth enhancer (or grow tube) in this manner is also advantageous because it enables the device to be reused after the protected seedling has matured to the point that protection is no longer necessary. This is accomplished by releasing the top and/or bottom fastening means, which enables the tube to be spread over its length and hence removed from the grapevine or other seedling. The tube can then be reused by placing it around a new seedling, or stored for further use by nesting a number of the resilient tubes together.

It is conventional to connect the overlapping edges of the grow tube by staples. Stapling is an economic approach to fastening, although a stapling tool is required in the field at the time the grow tube is placed, and it requires some degree of strength and dexterity to properly affix the staples. An alternative embodiment for fastening adjacent edges of the grow tube takes the form of a unique slidable clip having a H configuration in cross-section with a length that corresponds to the length of the grow tube. The opposed legs of the H-shaped clip are biased together and the distance therebetween, at least at the entry point, is less than that of the thickness of the sheet material from which the grow tube is manufactured. This enables a user to connect the opposed edges of the grow tube either by forcing each edge between the spaced legs of the H-clip, or sliding the H-clip longitudinally over the adjacent edges. In either manner, the edges are quickly and easily joined together without the use of any type of tool. Use of the H-clip is also beneficial in maintaining the tube diameter uniform over its length.

Further, the edges of the grow tube may be easily spread apart by raising the H-clip a sufficient amount to permit edge spreading and access. Also, the grow tube may be reused by removing the H-clip, spreading the edges to the point that the tube can be removed from the seedling, and subsequently rejoined for use on a new seedling.

One of the preferred embodiments of the invention is specifically intended to be placed over the seedling and to be supported by mounding earth around the base of the grow tube. An alternative embodiment utilizes an overhead suspension wire, known in the vineyard industry as a cordon or fruiting wire, and includes a unique hanger that interfaces with the top of the grow tube and wraps around the suspension wire. In this manner, the grow tube is firmly held in place from above as well as supported by the ground below.

The inventive grow tube is highly advantageous because it provides easy access to the grape seedling for weed removal, pruning and determining the vitality of the plant. As a consequence, growth of the seedling is enhanced, causing it to mature more quickly and to produce grapes at an earlier point in time.

The various functions and features of the invention will be more fully appreciated from the specification and drawings.

BRIEF DESCRIPTION OF THE DRAWINGS

FIG. 2 is a fragmentary view of a seedling growth enhancer being installed in the ground;

FIG. 3 is a front elevational view of the installed seedling growth enhancer spread to permit pruning;

FIG. 4 is an enlarged fragmentary perspective view of the seedling growth enhancer as secured to an anchoring stake;

DESCRIPTION OF THE PREFERRED EMBODIMENTS

With initial reference to FIGS. 1–4, a seedling growth enhancer or grow tube embodying the invention is represented generally by the numeral 11. Device 11 takes the form of a length of tubing 12 that is extruded from a thermoplastic material described more fully below. Preferably, the thermoplastic composition resists ultraviolet light and is capable of being used and reused over a significant period of time.

Figure 6:
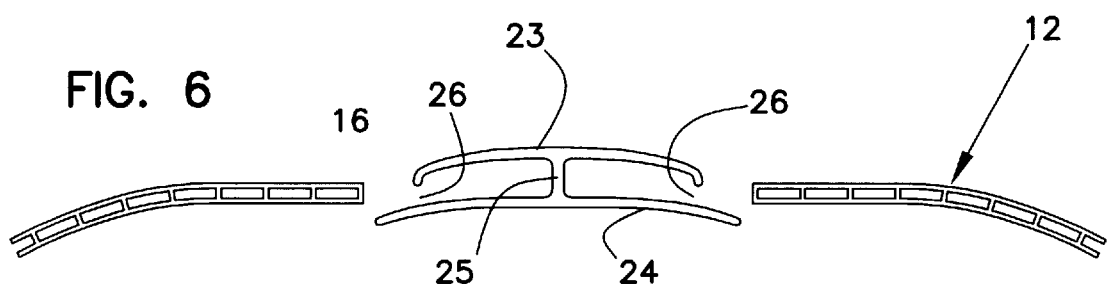
FIG. 6 is an end view of the fastening means with the opposed edges of the seedling growth enhancer prior to fastening.
Figure 7:
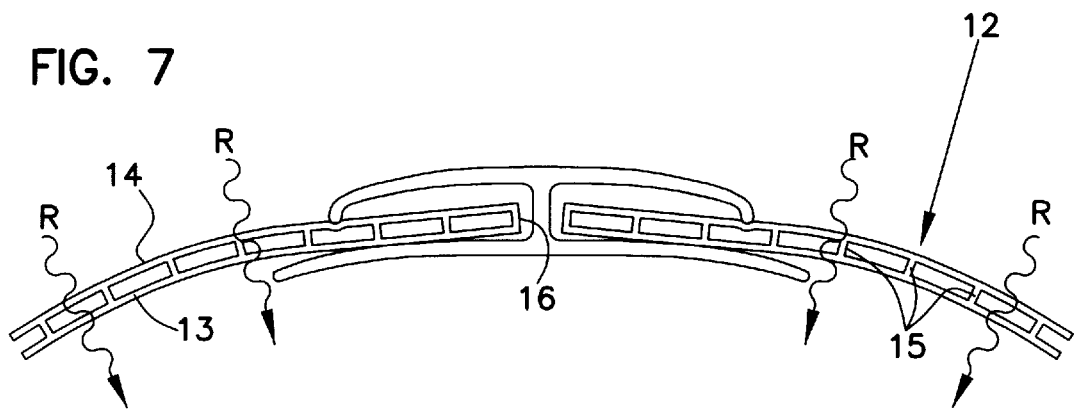
FIG. 7 is a view similar to FIG. 6 with the opposed edges of the seedling growth enhancer fastened by the fastening means.

With reference to FIGS. 6 and 7, the plastic tubing 12 is preferably of twin wall construction, having an inner wall 13 and a spaced parallel outer wall 14 interconnected by a plurality of transverse wall spacers 15. The overall thickness of the twin wall is on the order of 40–100 mils To enhance photosynthesis and growth, the thermoplastic material must be capable of transmitting light rays R (FIG. 7), and the twin-walled tube is therefore translucent or transparent (i.e., non-opaque).

Figure 1:
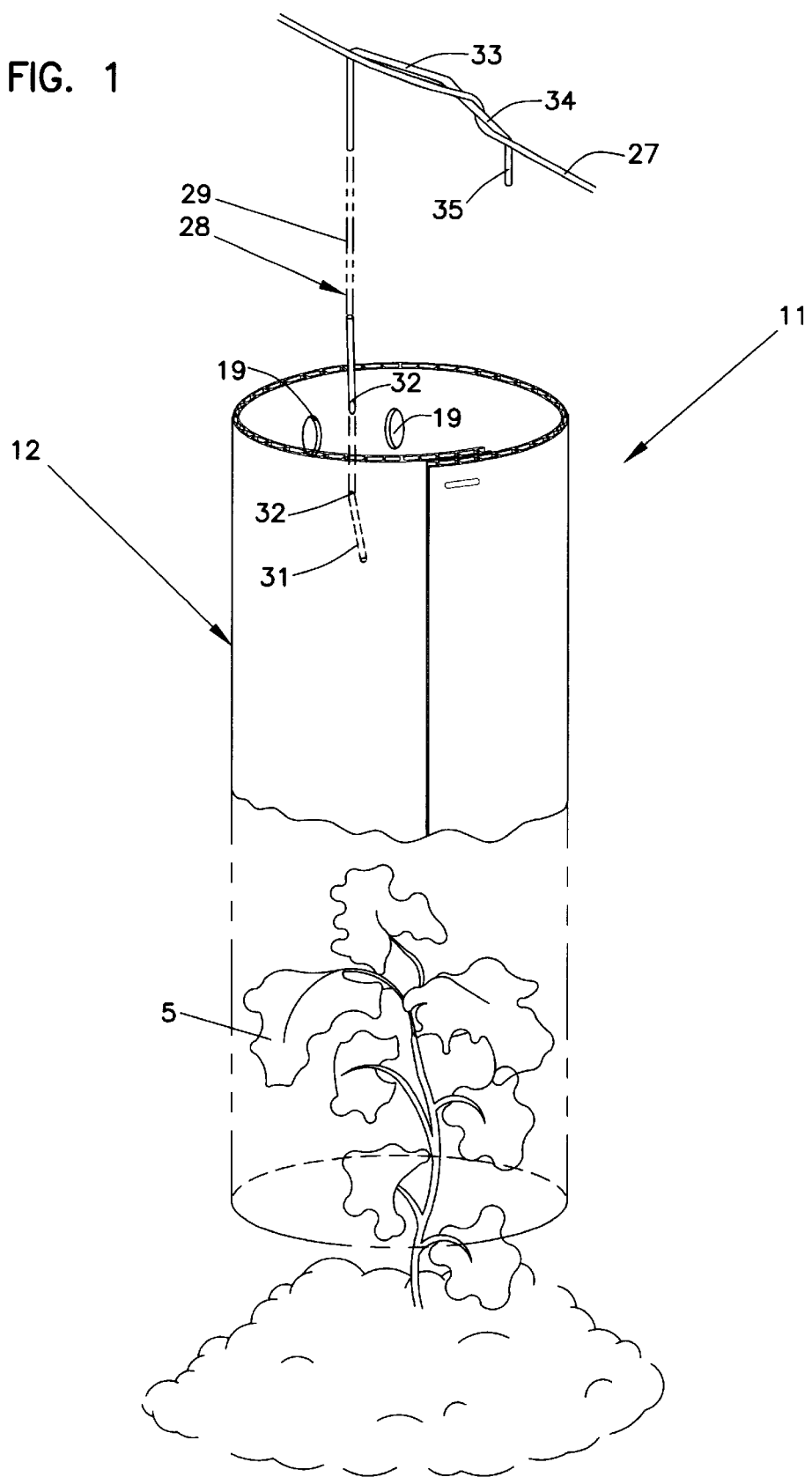
FIG. 1 is a perspective view of a seedling growth enhancer embodying the invention which utilizes a removable joinder clip and a hanger for overhead suspension.

As best shown in FIGS. 2, 6 and 7, a longitudinal slit 16 is formed in plastic tubing 12 from top to bottom. It is important that, even with longitudinal slit 16, tubing 12 inherently remains in a tubular state; i.e., it has inherent resilience or "memory" that causes it to return to this tubular state even though the longitudinal edges defining slit 16 are set apart. This is most effectively accomplished by extruding the plastic tubing 12 into tubular form, cutting it to required lengths and then cutting the longitudinal slit 16. Other means or structures may be used provided the tubing 12 has the tendency to return to its normal tubular form as shown in FIG. 1.

With continued reference to FIGS. 3 and 4, the grow tube 11 is preferably fastened at both the top and bottom of the slit 16 by a fastener such as a staple 17, although it is possible to use only a single staple 17 at either the top or the bottom.

With reference to FIG. 3, grow tube 11 may be installed by spreading it around the seedling and then mounding earth around the bottom of the tubing 12 to hold it in place. It is also possible to force the lower edge of tubing 12 into the earth around the seedling if the earth is sufficiently soft.

As shown in FIG. 4, it is also possible to drive an anchoring stake 18 into the ground adjacent grow tube 11. A pair of apertures 19 are formed at both the lower and upper ends of tubing 12 permitting it to be tied to the stake 18 with string 21. The placement of apertures 19 at both ends enables the grow tube 11 to be tied to the stake at spaced points for greater stability, and also enables the grow tube 11 to be used both right side up and upside down.

With reference to FIG. 3, grow tube 11 is shown in connection with a grapevine seedling S which has grown to the point that its upper end (also known as the primary leader) projects beyond the top of tubing 12. During such growth, a number of intermediate or secondary leaders L have grown which require pruning. With conventional seedling growth enhancers, pruning would not be possible without removing the device itself. However, the inventive grow tube 11 permits access for pruning by spreading the opposed longitudinal edges of slit 16 at an intermediate point, holding the edges apart with one hand and pruning the secondary leaders L with the other. After the pruning has been completed, release of the edges causes the tubing 12 to return to its tubular form as shown in FIGS. 1 and 2. In this regard, it has been found that forming tubing 12 from relatively rigid material, such as high density polyethylene, provides good rigidity and stability to the grow tube 11, but also makes the opposed edges at slit 16 difficult to spread with one hand. If both hands are required, it is difficult if not impossible to have a free hand necessary to insert the pruning tool through the access opening.

The material to be used must, therefore, be of sufficient rigidity as to enable the grow tube 11 to protectively stand and surround the seedling S, but also sufficiently supple as to permit the slit 16 to be spread and maintained as an access opening with a single hand. We have found that the force necessary to spread slit 16 should not be more than about 0.5 pounds. With the twin-wall construction shown, extruding tubing 12 from low-density polyethylene suitably provides this function.

Although staples 17 perform satisfactorily in holding the top and bottom overlapped edges of tubing 12 together, they require having a manual stapler in the field, which is a disadvantage. Further, if the grow tube 11 is to be reused after the seedling S grows to a sufficient size, the staples must be removed before the tubing 12 can be spread apart and removed. Removing the staples 17 is also problematic because it requires a staple remover, pliers, or the like and requires time to perform this removing task. While the time is not overly significant with regard to a single grow tube 11, it must be kept in mind that large vineyards use thousands of the grow tubes and each repetitive task increases both the time and cost of maintenance.

FIGS. 1 and 5–7 disclose a fastening device 22 that is quickly and easily used without the need for a tool, and which firmly but releasably holds the opposed edges of slit 16 together. The fastening device 22 has a generally H-shaped transverse cross-section and is defined by a slightly curved leg 23, a slightly curved leg 24, and an intermediate connecting leg 25. The legs 23, 24 together define opposed leg pairs at each side of the device. Leg 23 is shorter than leg 24, and its extreme ends curve more aggressively toward leg 24 to define opposed gaps 26 between the opposed leg pairs, the size of which is less than the thickness of twin-wall tubing 12. H-clip 22 is preferably extruded from a thermoplastic such as polyvinylchloride or polyethylene and the legs 23, 24 may therefore be resiliently spread apart to permit entry of the edge of tubing 12 after which it is held frictionally by the inward spring bias of the leg pair.

The entry of each opposed edge of tubing 12 into the H-clip 22 is guided into the gap by the segment of leg 24 which extends laterally beyond the ends of leg 23. As particularly shown in FIG. 7, the aggressive curvature of the extreme ends of leg 23 causes it to bite into the outer wall of the twin-wall tubing 12 and cause it to be depressed between adjacent spacers 15. This improves the gripping power of the H-clip 22, ensuring that the opposed edges of tubing 12 will be held in fixed relation during seedling growth.

Figure 5:
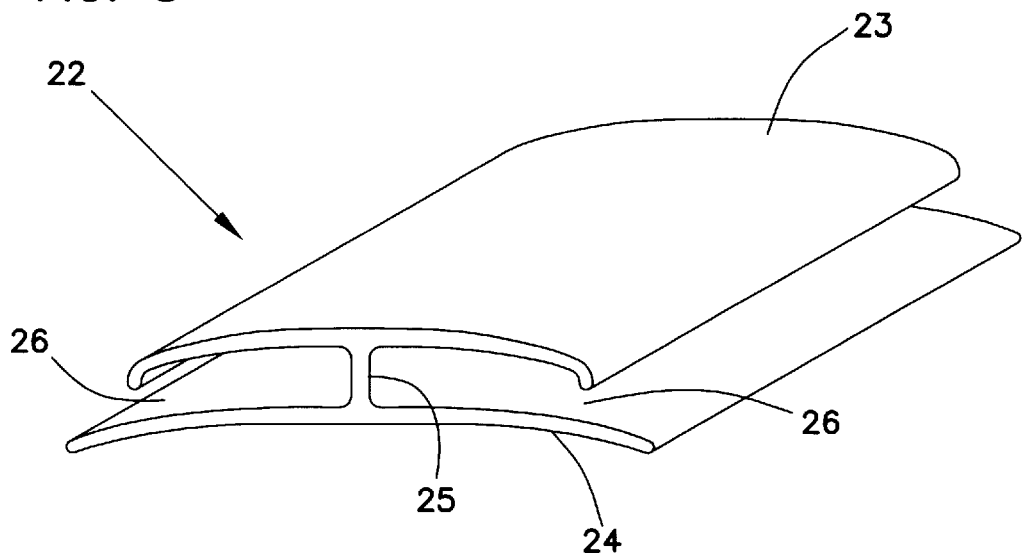
FIG. 5 is a perspective view of an improved fastening means for joining the opposed edges of the seedling growth enhancer.

H-clip 22 may be used either as a single length that generally corresponds to the length of tubing 12, or as a shorter individual clip as shown in FIG. 5. In either case, access to the seedling S may be easily gained. If a single length is used, access to the seedling S is gained by sliding the clip upward until a sufficient length of slit 16 is exposed to permit the opposed tubing edges to be spread apart. If the short clip is used, one is placed at the top and one at the bottom of tube 12 in the same position as the staples earlier described, and slit 16 is spread at an intermediate point without removal of either clip 22. In either case, the H-clip 22 can be easily removed, either by pulling it longitudinally or by gripping the opposed sides of tubing 12 and pulling them from the clip 22, which enables the removal of grow tube 11 from the grown seedling S for reuse.

Grow tubes 11 may be conventionally placed as shown in FIGS. 2 and 4; i.e., by mounting earth at the base of the grow tube 11 and stabilizing it with a stake 18. However, it is also conventional in vineyards to use overhead suspension wires that extend along rows of grape seedlings, such as suspension wire 27 as shown in FIG. 1. This enables the use of a hanger 28 which fits over the suspension wire 27 and frictionally interlocks with tubing 12.

Hanger 28 is formed from a length of ductile wire that is bent into a specific configuration. As shown in FIG. 1, hanger 28 has a primary leg 29 that is straight in the preferred embodiment but which is bent at a relatively low obtuse angle to define a short angled leg 31. A pair of substantially vertically spaced apertures 32 are formed through tubing 12 in its upper end in the side opposite the slit 16. The angled leg 31 enables the lower end of hanger 28 to be through the upper aperture 32 from the inside of tubing 12, and then to be threaded back through the lower aperture 32 into the position shown in FIG. 1. This is permitted by the flexibility of the ductile wire of hanger 28 as well as the resilience of the twin-walled tubing 12. As the result, the main leg 29 is frictionally held in the position shown and this position may be adjusted to reconcile the distance between the top of grow tube 11 and the suspension wire 27.

The upper end of hanger 28 is bent to define a hooking portion defined by a first leg 33 that is bent at 90° relative to main leg 29, a second leg 34 that is also 90° relative to main leg 29 but bent at an obtuse angle relative to first leg 33, and third leg 35 that is bent 90° to be parallel with main leg 29.

Figure 8:
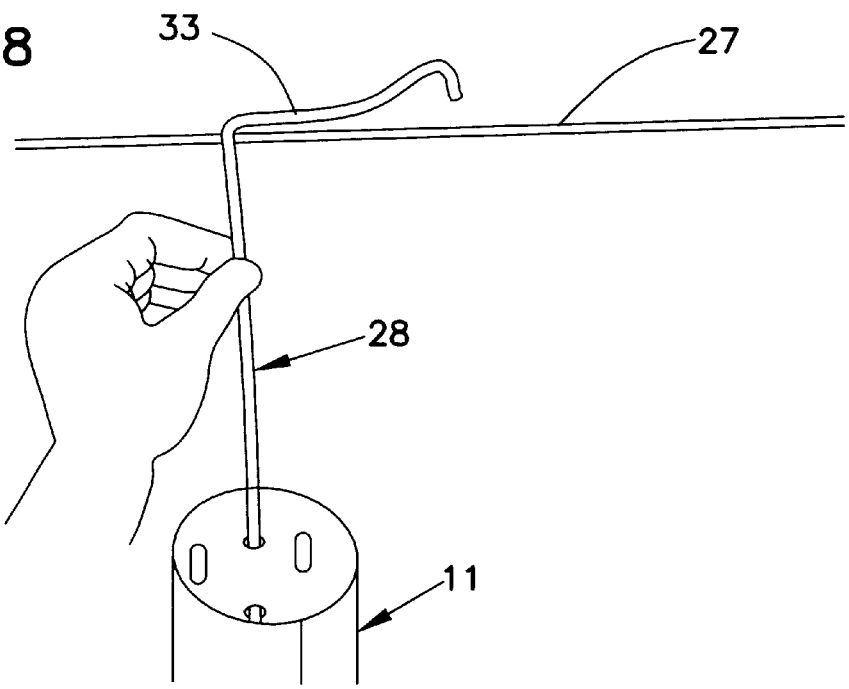
FIGS. 8–12 are fragmentary front elevational views of the seedling growth enhancer and hanger, showing through progressive steps how the hanger is connected to an overhead suspension wire.
Figure 9:
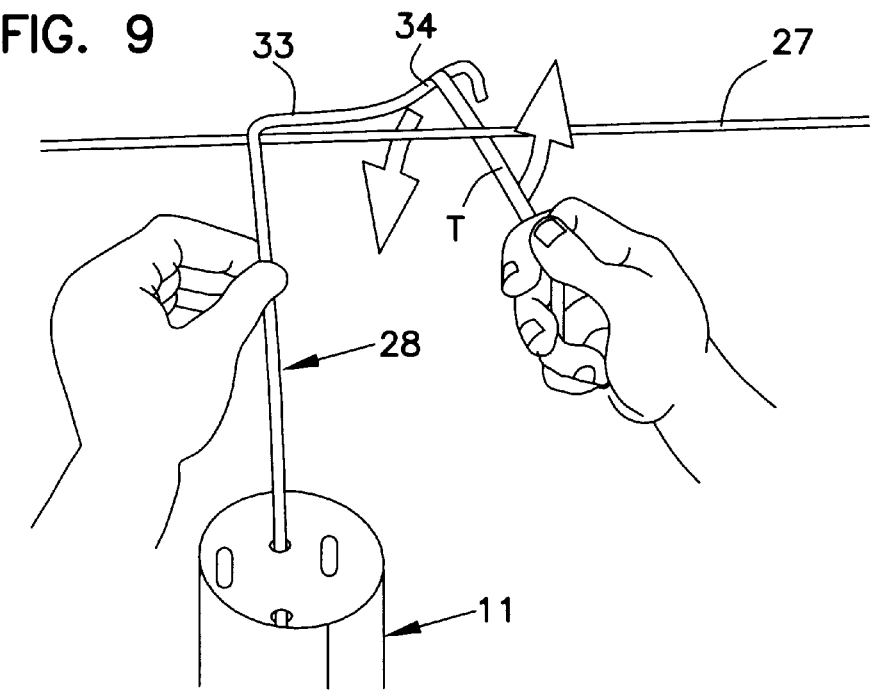
Figure 10:
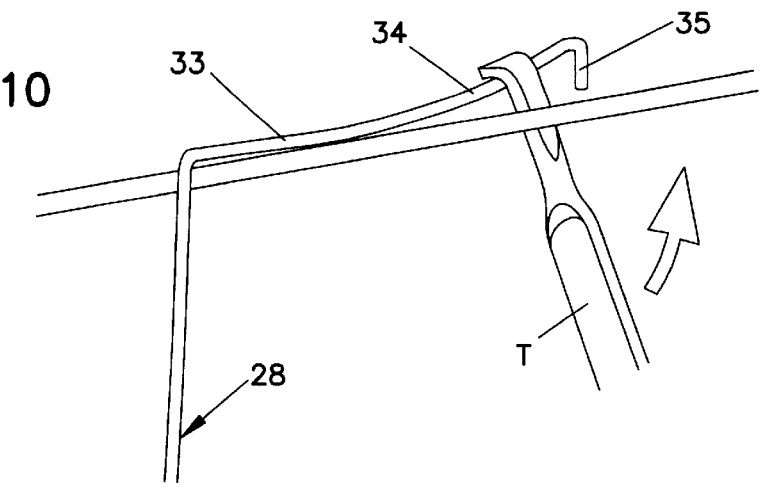
Figure 11:
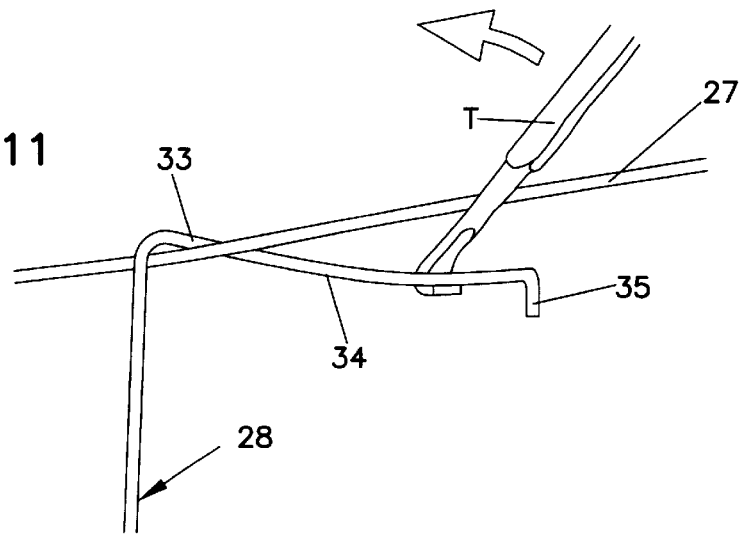
Figure 12:
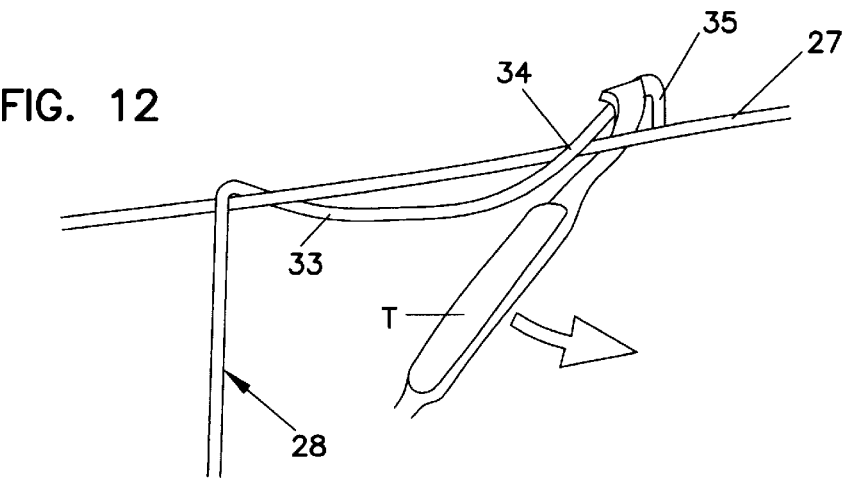

FIGS. 8–12 show how the hanger 28 is used in suspending the grow tube 11 from the Cordon wire 27. With reference to FIG. 8, the hanger 28 is initially placed with the leg 33 overlying Cordon wire 27. In FIG. 9, the leg 34 is grasped, either by hand or through the use of a tool T. With reference to FIG. 10 tool T is drawn downward until the leg 34 and leg or hook 35 lie below the Cordon wire as shown in FIG. 11. Next, as shown in FIGS. 11 and 12, tool T engages leg 34 and draws it upwardly and around Cordon wire 27. As shown in FIG. 12, tool T is now rotated downward without disengaging it from leg 34, and leg 34 is pushed up and over Cordon wire until hook 35 engages Cordon wire 27. The final position of hanger 28 is shown in FIG. 1, with Cordon wire 27 threaded around legs 33, 34 and hook 35 of hanger 28. The obtuse angle subtended between legs 33, 34 provided a pivot point during this threading procedure.

With grow tube 11 firmly suspended from Cordon wire 27, its position relative to hanger 28 may now be adjusted so that the bottom of tube 12 rests on the ground below. It is strongly preferable that, with the tube 12 so adjusted, loose earth be mounted around the base of the tube 12 so that it is supported from the bottom as well as the top.

It will be appreciated that hanger 28 may be quickly and easily inserted into the apertures 32 of a grow tube 11, followed by hooking the hanger 28 over and threading it around Cordon wire 27. Properly installed, grow tube 11 is firmly and stably supported at its upper end by Cordon wire 27 and at its lower end by the mounted earth. With slit 16 in direct opposition to hanger 28 and with the use of either staples or clips 22, access to the seedling 16 may be readily gained in much the same way as shown in FIG. 3.

We claim:

1. A seedling growth-enhancing device comprising:
    a seedling enclosure member of tubular configuration and of predetermined transverse dimension and length as to at least partially encompass a planted seedling, the enclosure member having a top end and a bottom end, the enclosure member being made from flexible, non-opaque material and having a slit formed over its length to define adjacent longitudinal edges, said flexible, non-opaque material being inherently resilient so that the enclosure member is normally biased into said tubular configuration;
    means for fastening said adjacent longitudinal edges together proximate at least one of the top end and bottom end of the tubular enclosure member; the fastening means being constructed and disposed to permit said longitudinal edges to be spread apart at an intermediate point on said enclosure member to permit access to the interior thereof;

and the non-opaque material of said enclosure member being sufficiently flexible and supple as to permit said longitudinal edges to be spread apart with a force of no more than about 0.5 pounds, and being sufficiently resilient as to cause said longitudinal edges to close said access opening when said force is removed.

2. The seedling growth-enhancing device defined by claim 1, wherein the seedling enclosure member comprises a circular tube.

3. The seedling growth-enhancing device defined by claim 1, wherein the tubular enclosure member is formed from a sheet of material defined by spaced, parallel walls.

4. The seedling growth-enhancing device defined by claim 1, wherein the seedling enclosure member is formed from thermoplastic material.

5. The seedling growth-enhancing device defined by claim 4, wherein the thermoplastic material is low-density polyethylene.

6. The seedling growth-enhancer defined by claim 4, wherein the thermoplastic material is resistant to ultraviolet light.

7. The seedling growth-enhancing device defined by claim 1, wherein the seedling enclosure member comprises a straight tube and the longitudinal slit is parallel to the axis of the tube.

8. The seedling growth-enhancing device defined by claim 1, wherein the non-opaque material is translucent.

9. The seedling growth-enhancing device defined by claim 1, wherein the fastening means is constructed and arranged to releasably fasten said adjacent longitudinal edges together.

10. The seedling growth-enhancing device defined by claim 9, wherein a releasable fastening means is disposed proximate each of the top and bottom of the tubular enclosure member.

11. The seedling growth-enhancing device defined by claim 9, wherein the releasable fastening means comprises a resilient clip having a generally H-shaped cross-section, the clip defining opposed openings into which said adjacent longitudinal edges may be respectively inserted, said opposed openings being at least in part smaller in size than the thickness of the non-opaque material at said longitudinal edges.

12. The seedling growth-enhancing device defined by claim 1, which further comprises hanger means releasably connectable to said tubular enclosure member for suspending the enclosure member from an overhead point.

13. The seedling growth-enhancing device defined by claim 1, which further comprises a pair of string-tying apertures formed in the seedling enclosure member at a point remote from the slit to permit the seedling enclosure member to be tied to an anchoring stake.

14. A seedling growth-enhancing device comprising:

a seedling enclosure member of tubular configuration and of predetermined transverse dimension and length as to at least partially encompass a planted seedling, the enclosure member being made from resiliently flexible non-opaque material and having a slit formed over its length to define adjacent longitudinal edges; and means for releasably fastening at least a portion of said adjacent longitudinal edges together, the fastening means being constructed and disposed to permit said longitudinal edges to be spread apart at an intermediate point on said enclosure member to permit access to the interior thereof, and comprising:

first and second pairs of leg means respectively defining first and second edge receiving opening therebetween;

means for normally holding said first and second pairs of leg means in a predetermined position so that first and second openings are smaller in size than the thickness of said non-opaque material at said longitudinal edges; and said fastening means being formed from resiliently flexible material, whereby the insertion of said adjacent longitudinal edges into said openings causes said leg means to resiliently spread apart and frictionally hold said adjacent longitudinal edges together.

15. The seedling growth-enhancing device defined by claim 14, wherein the fastening means comprises a resilient clip having a generally H-shaped cross-section.

* * * * *